United States Patent [19]

Plevak et al.

[11] 4,187,042

[45] Feb. 5, 1980

[54] ADVANCE MECHANISM FOR A MINE ROOF SUPPORT UNIT

[75] Inventors: Lubomir Plevak, Lunen; Jürgen Dodt, Menden, both of Fed. Rep. of Germany

[73] Assignee: Gewerkschaft Eisenhütte Westfalia, Lunen, Fed. Rep. of Germany

[21] Appl. No.: 945,380

[22] Filed: Sep. 25, 1978

[30] Foreign Application Priority Data

Oct. 6, 1977 [DE] Fed. Rep. of Germany ....... 2744992

[51] Int. Cl.² .............................................. E21D 15/44
[52] U.S. Cl. .................................................... 405/291
[58] Field of Search ................................ 405/291–301; 299/31, 33; 91/170 MP

[56] References Cited

U.S. PATENT DOCUMENTS

| 3,482,878 | 12/1969 | Floter | 405/299 X |
| 3,911,686 | 10/1975 | Becker et al. | 405/296 |
| 3,915,500 | 10/1975 | Schlusener et al. | 405/296 X |

FOREIGN PATENT DOCUMENTS 1277789  9/1968  Fed. Rep. of Germany ........... 405/291

*Primary Examiner*—Dennis L. Taylor
*Attorney, Agent, or Firm*—Neil F. Markva

[57] ABSTRACT

The invention relates to an advance mechanism for a roof support unit to be used in a longwall face of a mineral mining working. The advance mechanism comprises a hydraulic advance ram and guide means constituted by a guide rod means and a guide rail. One end of the guide rod means is attached to a conveyor extending along the longwall face, the other end of the guide rod means being attached to a guide element. The guide rail extends slidably through a guide aperture in the guide element and is pivotally attached to the floor sill of the roof support unit for pivotal movement in a vertical plane perpendicular to the longwall face. The hydraulic advance ram is attached to the guide element and acts on a member fixed to the floor sill.

13 Claims, 3 Drawing Figures

ADVANCE MECHANISM FOR A MINE ROOF SUPPORT UNIT

This invention relates to an advance mechanism for a mine roof support unit.

A known type of mine roof support assembly is constituted by a plurality of identical roof support units positioned side-by-side along, for example, a longwall face. Each of the units has a roof shield supported on a floor sill by means of hydraulic props. In order to advance the assembly to follow the advance of the longwall face, the roof support units are advanced, individually or in groups, by means of hydraulic advance rams. During the advance of any given unit, its hydraulic props are relaxed so that its roof shield is not under load.

A known type of advance mechanism for such a roof support unit comprises a pair of guide rods and a hydraulic advance ram. The front ends of the guide rods are attached, for example, to a longwall conveyor, and the rear ends are coupled together by a cross-piece. The advance ram acts on the cross-piece, the floor sill of the unit providing an abutment for the advance ram. The cross-piece is longitudinally displaceable in the direction of advance in guide slideways provided in the mutually facing sides of two girders constituting the floor sill. The cross-piece is also pivotable in a vertical plane about a horizontal axis parallel to the longwall face.

Unfortunately, advance mechanisms of the type are relatively expensive to manufacture. Moreover, in use, there is a danger that the guide slideways of the floor girders may be blocked with earth, coal or rocks and that the cross-piece may, in consequence, be forced out of the slideways. Another disadvantage, is that the two floor girders, being linked via the cross-piece and the slideways, have only a limited capacity of adapting themselves to irregularities in the floor of the mine working.

The aim of the present invention is to provide an advance mechanism for a roof support unit, which mechanism does not suffer from the disadvantage of the known mechanisms.

The present invention provides an advance mechanism for a roof support unit to be used in a longwall face of a mineral mining working, the advance mechanism comprising a hydraulic advance ram and guide means, the guide means being constituted by guide rod means and a guide rail, one end of the guide rod means being attachable to a conveyor extending along the longwall face, the other end of the guide rod means being attached to a guide element, the guide rail extending slidably through a guide aperture in the guide element and being pivotally attachable to the roof support unit for pivotal movement in a vertical plane perpendicular to the longwall face, the hydraulic advance ram being attached to the guide element and acting, is use, on a member fixed to the support unit.

The advantage of this advance mechanism is that there is very little chance of the guide means being affected by the ingress of dirt, earth or coal dust, since any such foreign matter which is deposited on the guide rail is scraped away by the sliding action of the guide rail within the guide aperture of the guide element.

Advantageously, the guide rod means is constituted by a pair of parallel guide rods, the guide rods being interconnected by the guide element. Preferably, the guide rail is positioned centrally between the two guide rods. The guide rail may have the same diameter as each of the guide rods, so that these parts can be manufactured from the same stock. The length of the guide rail may be less than that of the guide rod means, and need not be substantially greater than the length of the working stroke of the hydraulic advance ram.

The advance mechanism may further comprise a head-piece attached to the guide rod means at said one end, the head-piece being attachable to the conveyor and being acted upon by a hydraulic control ram backed by the conveyor. Then, the advance mechanism can be used with known systems for controlling the angle of tilt of the conveyor.

The invention also provides a roof support unit for use in a longwall face of a mineral mining working, the roof support unit having a floor sill and a roof shield supported on the floor sill by hydraulic prop means, wherein the roof support unit is provided with an advance mechanism as defined above.

Advantageously, the guide rail is pivotally attached to the floor sill and the hydraulic advance ram acts on a member fixed to the floor sill. Preferably, the floor sill is constituted by two spaced-apart floor girders which extend, in use, substantially perpendicular to the longwall face, the advance mechanism being positioned between the floor girders, and the guide rail being pivotally attached to one of the floor girders. In this case, the hydraulic advance ram may be connected to a transverse rod which is guided in elongate guide slots formed in upstanding brackets attached to the floor girders. Preferably, the piston rod of the hydraulic advance ram is connected to the transverse rod, the cylinder of the hydraulic advance ram being pivotally attached to the guide element. Each of said elongate slots may be inclined at a slight angle to the vertical with its upper end further from the guide element than its lower end. This arrangement has the advantage that the floor girders can readily adapt themselves to irregularities in the floor of the mine working without effecting the proper functioning of the advance mechanism.

The advance mechanism described above could also be used with roof support units having a single, undivided floor sill.

A mine roof support unit incorporating an advance mechanism constructed in accordance with the invention will now be described, by way of example, with reference to the accompanying drawings, in which.

Figure 1:
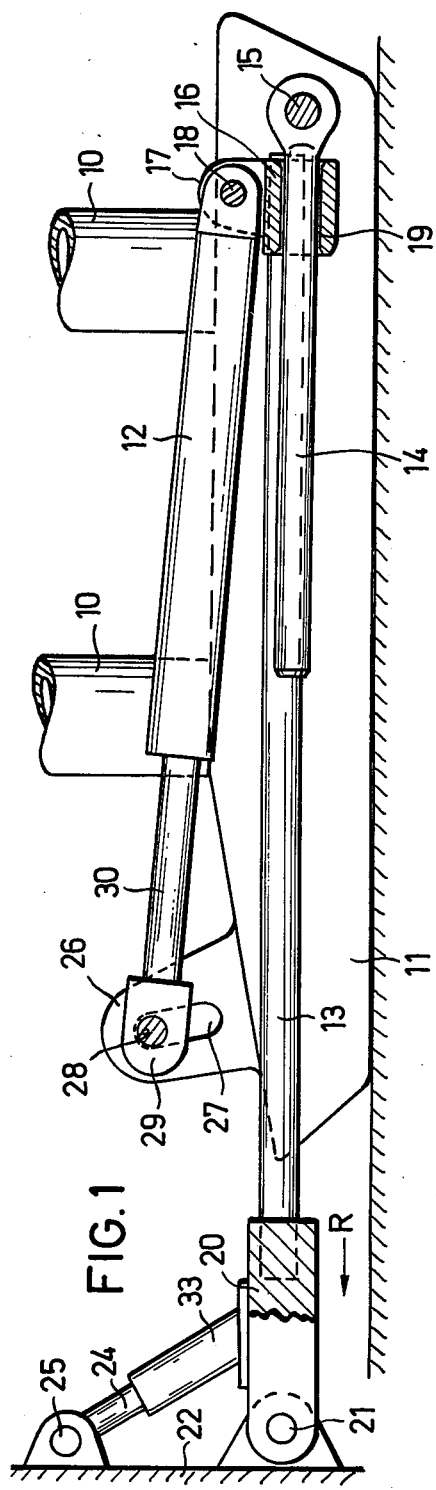
FIG. 1 is a part-sectional side elevation of the lower zone of the unit.
Figure 2:
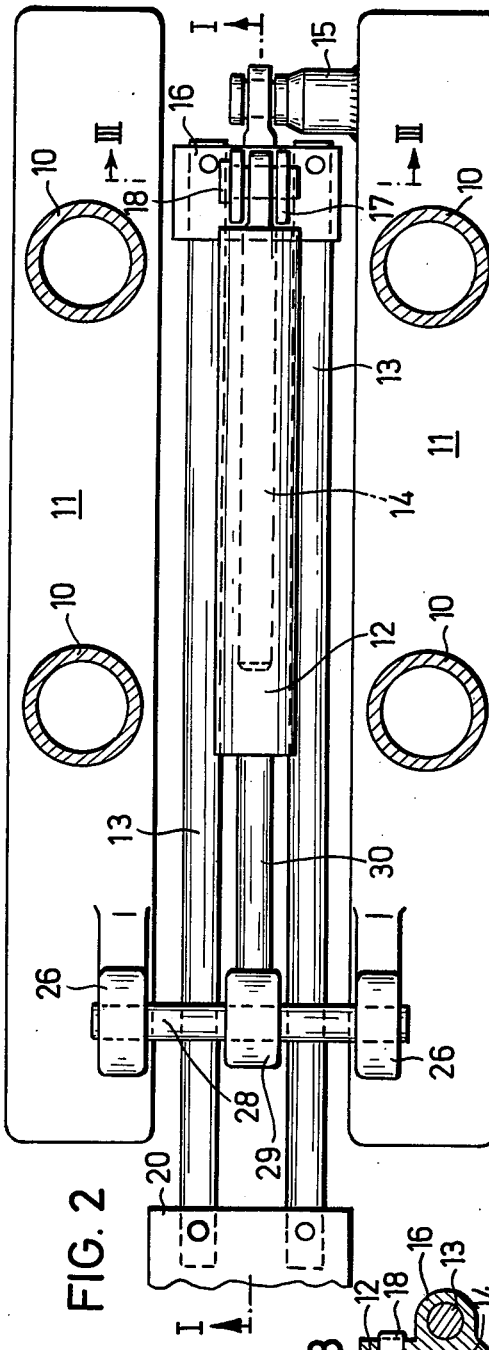
FIG. 2 is a plan view of the unit.

Referring to the drawings, FIGS. 1 and 2 show a mine roof support unit having a roof shield (not shown) supported by means of four hydraulic props 10 upon a floor sill constituted by two girders 11 and 11'. As shown in FIG. 2, the props 10 are arranged at the corners of a rectangle.

The advance mechanism for the unit comprises a hydraulic advance ram 12, two parallel cylindrical guide rods 13 and a cylindrical guide rail 14, the guide rods and the guide rail having the same diameter. The rear (goaf) end of the guide rail 14 is pivotally connected to rear end of the floor girder 11' by means of an articulated joint 15 whose pivotal axis is horizontal and parallel to a longwall face (not shown). The guide rail can, therefore, pivot in vertical plane perpendicular to the longwall face.

Figure 3:
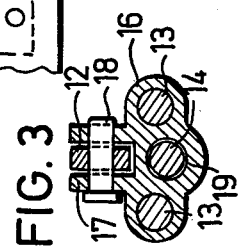
FIG. 3 is a cross-section taken on the line III—III of FIG. 2.

The rear ends of the two parallel guide rods 13 are interconnected by means of a cross-piece 16. The cross-piece 16 is provided with a forked extension 17 which connects the cross-piece to a bracket 12' provided on the end of the cylinder of the ram 12 by means of a bolt 18. A central cylindrical guide opening 19 is provided within the cross-piece 16 immediately below the extension 17, the guide rail 14 passing through this guide opening with the requisite guide clearance. As best seen in FIGS. 2 and 3, the guide rail 14 is positioned centrally between the two guide rods 13 and hence centrally between the two girders 11 and 11'.

The forward ends of the guide rods 13 are connected to a yoke 20 which in turn is connected (by means of a pivot 21) to a longwall conveyor 22 which extends along the face. Alternatively, the yoke 20 could be attached to a guide for a winning machine such as a plough. If, as is known per se, the advance mechanism is also to function as an overhead control system for controlling the cutting depth of a winning machine, then a hydraulic control ram 33 is provided. The cylinder of this control ram 33 is pivotally connected to the yoke 20, and its piston rod 24 is pivotally connected to the conveyor 22 at 25.

The forward ends of the girders 11 and 11' are each provided with an upstanding bracket 26. The brackets 26 are each provided with an elongate slot 27, the slots 27 accommodating a transverse rod 28 which is connected to a head 29 provided on the free end of the piston rod 30 of the ram 12. The slots 27 (see FIG. 1) are inclined at a slight angle to the vertical as that their upper ends are nearer to the face than their lower ends.

The advance mechanism works in the following manner. When the advance ram 12 is retracted, the conveyor 22 is moved, by means of the guide rods 13, in the advance direction R. During this movement the head 29, which is fixed via the rod 28 and the girders 11 and 11' of the loaded roof support unit, forms an abutment. The props 20 of the unit are then retracted slightly so that the unit is unloaded. The unit can then be advanced, to follow-up the advance of the conveyor 22, by extending the ram 12, the conveyor forming an abutment for this movement. During the advance of both the conveyor 22 and the unit, the advance mechanism is guided by the sliding guide constituted by the cross-piece 16 and the guide rail 14. Since the advance mechanism is attached only to the floor girder 11' via the guide rail 14, and since this connection is a pivotal connection, the two floor girders 11 and 11' can adapt themselves to irregularities in the floor of the longwall working independently of one another. This adjustability is assisted by the rod/slot connection 27,28 between the piston rod 30 of the ram 12 and the floor girders 11 and 11'. Moreover, the guide rail 14 also assists this adjustability, since the cross-piece 16 (and then the guide rods 13 and the ram 12) is pivotable about the longitudinal axis of the guide rail.

It will be apparent that the advance mechanism described above could be modified. Thus, the two parallel guide rods 13 could be replaced by a single guide rod, in which case the cross-piece 16 would be replaced by a guide member forming an abutment for the advance ram 12 and a sliding guide for the guide rail.

We claim:

1. In a roof support unit for use in a longwall face of a mineral mining working, the roof support unit having a floor sill, a roof shield supported on the floor sill by hydraulic prop means, and an advance mechanism comprising a hydraulic advance ram and guide means, the improvements comprising constituting the guide means by guide rod means and a guide rail, one end of the guide rod means being attached to a conveyor extending along the longwall face, the other end of the guide rod means being attached to a guide element, the guide rail extending slidably through a guide aperture in the guide element and being pivotally attachable to the roof support unit for pivotal movement in a vertical plane perpendicular to the longwall face, the hydraulic advance ram being attached to the guide element and acting on a member fixed to the support unit.

2. An advance mechanism according to claim 1, wherein the guide rod means is constituted by a pair of parallel guide rods, the guide rods being interconnected by the guide element.

3. An advance mechanism according to claim 2, wherein the guide rail is positioned centrally between the two guide rods.

4. An advance mechanism according to claim 2, wherein the guide rail has the same diameter as each of the guide rods.

5. An advance mechanism according to claim 1, wherein the length of the guide rail is less than that of the guide rod means.

6. An advance mechanism according to claim 1, further comprising a head-piece attached to the guide rod means at said one end, the head-piece being attachable to the conveyor and being acted upon by a hydraulic control ram backed by the conveyor.

7. A roof support unit for use in a longwall face of a mineral mining working, the roof support unit having a floor sill, a roof shield supported on the floor sill by hydraulic prop means, and an advance mechanism comprising a hydraulic advance ram and guide means, the guide means being constituted by guide rod means and a guide rail, one end of the guide rod means being attached to a conveyor extending along the longwall face, the other end of the guide rod means being attached to a guide element, the guide rail extending slidably through a guide aperture in the guide element and being pivotally attachable to the roof support unit for pivotal movement in a vertical plane perpendicular to the longwall face, the hydraulic advance ram being attached to the guide element and acting on a member fixed to the support unit.

8. A roof support unit according to claim 7, wherein the guide rail is pivotally attached to the floor sill and the hydraulic advance ram acts on a member fixed to the floor sill.

9. A roof support unit according to claim 8, wherein the floor sill is constituted by two spaced-apart floor girders which extend, in use, substantially perpendicular to the longwall face, the advance mechanism being positioned between the floor girders, and the guide rail being pivotally attached to one of the floor girders.

10. A roof support unit according to claim 9, wherein the hydraulic advance ram is connected to a transverse rod which is guided in elongate guide slots formed in upstanding brackets attached to the floor girders.

11. A roof support unit according to claim 10, wherein the piston rod of the hydraulic advance ram is connected to the transverse rod, the cylinder of the hydraulic advance ram being pivotally attached to the guide element.

12. A roof support unit according to claim 11, wherein each of said elongate slots is inclined at a slight angle to the vertical with its upper end further from the guide element than its lower end.

13. A mineral mining installation comprising a longwall conveyor and a plurality of roof support units positioned side-by-side along the goaf side of the conveyor, wherein each of the roof support units is constituted by a floor sill, a roof shield supported on the floor sill by hydraulic prop means, and an advance mechanism comprising a hydraulic advance ram and guide means, the guide means being constituted by guide rod means and a guide rail, one end of the guide rod means being attached to the conveyor, the other end of the guide rod means being attached to a guide element, the guide rail extending slidably through a guide aperture in the guide element and being pivotally attachable to the roof support unit for pivotal movement in a vertical plane perpendicular to the conveyor, the hydraulic advance ram being attached to the guide element and acting on a member fixed to the support unit.

* * * * *